United States Patent
Irino et al.

(10) Patent No.: US 12,422,817 B2
(45) Date of Patent: Sep. 23, 2025

(54) MACHINING STATE INFORMATION ESTIMATION DEVICE AND MACHINING STATE DIAGNOSIS APPARATUS

(71) Applicants: DMG MORI CO., LTD., Nara (JP); Saitama University, Saitama (JP); Tokai National Higher Education and Research System, Aichi (JP); Keio University, Tokyo (JP)

(72) Inventors: Naruhiro Irino, Nara (JP); Yasuhiro Imabeppu, Nara (JP); Junichi Kaneko, Saitama (JP); Norikazu Suzuki, Aichi (JP); Yasuhiro Kakinuma, Kanagawa (JP)

(73) Assignees: DMG MORI CO., LTD., Nara (JP); Saitama University, Saitama (JP); Tokai National Higher Education and Research System, Aichi (JP); Keio University, Tokyo (JP)

( * ) Notice: Subject to any disclaimer, the term of this patent is extended or adjusted under 35 U.S.C. 154(b) by 901 days.

(21) Appl. No.: 17/633,306

(22) PCT Filed: Aug. 7, 2020

(86) PCT No.: PCT/JP2020/030371
§ 371 (c)(1),
(2) Date: Feb. 7, 2022

(87) PCT Pub. No.: WO2021/025149
PCT Pub. Date: Feb. 11, 2021

(65) Prior Publication Data
US 2022/0283564 A1   Sep. 8, 2022

(30) Foreign Application Priority Data

Aug. 7, 2019   (JP) ................................ 2019-145398

(51) Int. Cl.
G05B 19/4065   (2006.01)
G05B 19/4069   (2006.01)
G06T 11/00   (2006.01)

(52) U.S. Cl.
CPC ..... G05B 19/4065 (2013.01); G05B 19/4069 (2013.01); G06T 11/001 (2013.01);
(Continued)

(58) Field of Classification Search
None
See application file for complete search history.

(56) References Cited

U.S. PATENT DOCUMENTS

| | | |
|---|---|---|
| 2002/0049960 A1 | 4/2002 | Monz et al. |
| 2017/0308060 A1 | 10/2017 | Matsubara et al. |
| 2018/0246494 A1 | 8/2018 | Nakahama et al. |
| 2019/0235473 A1 | 8/2019 | Miyata et al. |

FOREIGN PATENT DOCUMENTS

| | | |
|---|---|---|
| JP | 2013054431 A | 3/2013 |
| JP | 2017072880 A | 4/2017 |
| WO | 2013118179 A1 | 8/2013 |

OTHER PUBLICATIONS

Machine Translation of WO 2013/118179 A1 (Year: 2013).*
(Continued)

*Primary Examiner* — Ryan A Jarrett
(74) *Attorney, Agent, or Firm* — von Briesen & Roper, s.c.

(57) ABSTRACT

A machining state diagnosis apparatus (10) includes a machining state information estimation device (1), a learning information storage (11) storing information on relationship between estimated machining state information and actual machining state information, and a machining state diagnosis unit (12) diagnosing a machining state in actual machining using control information, based on machining state information obtained during the actual machining, machining state information estimated based on corresponding control information by the machining state information estimation device (1), and the relationship information stored in the learning information storage 11. The machining state information estimation device (1) includes an information storage (2) storing the control information and information on a workpiece and a tool, a machining state information estimator (3) estimating machining state information
(Continued)

in relatively moving the workpiece and the tool, based on the information on the workpiece and the tool and the control information, and an image data generator (4) generating image data based on the estimated machining state information.

19 Claims, 14 Drawing Sheets

(52) U.S. Cl.
CPC .............. *G05B 2219/31048* (2013.01); *G05B 2219/35349* (2013.01); *G05B 2219/50308* (2013.01)

(56) References Cited

OTHER PUBLICATIONS

Machine Translation of JP 2013-054431 A (Year: 2013).*
Extended European Search Report for related Application No. 20850834.1; report dated Jun. 15, 2023.
International Search Report for related Application No. PCT/JP2020/030371; report dated Oct. 27, 2020.
Chinese Master's Theses Full-text Database Engineering Science and Technology II, Apr. 16, 2017-May 15, 2017.

* cited by examiner

FIG. 10
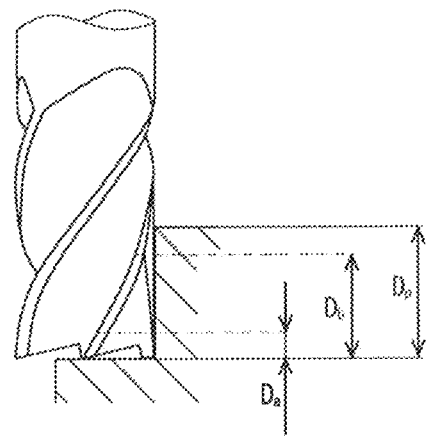
FIG. 11
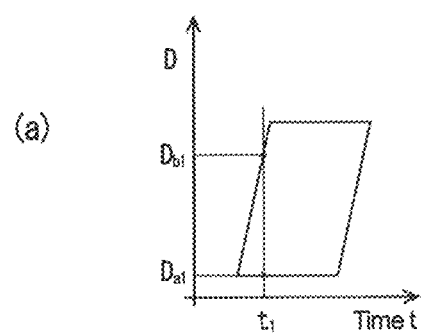
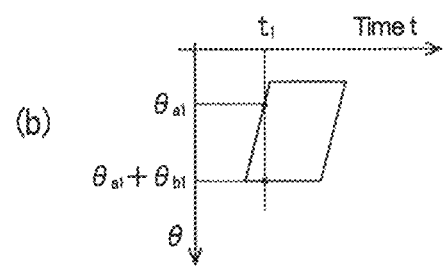

FIG. 13
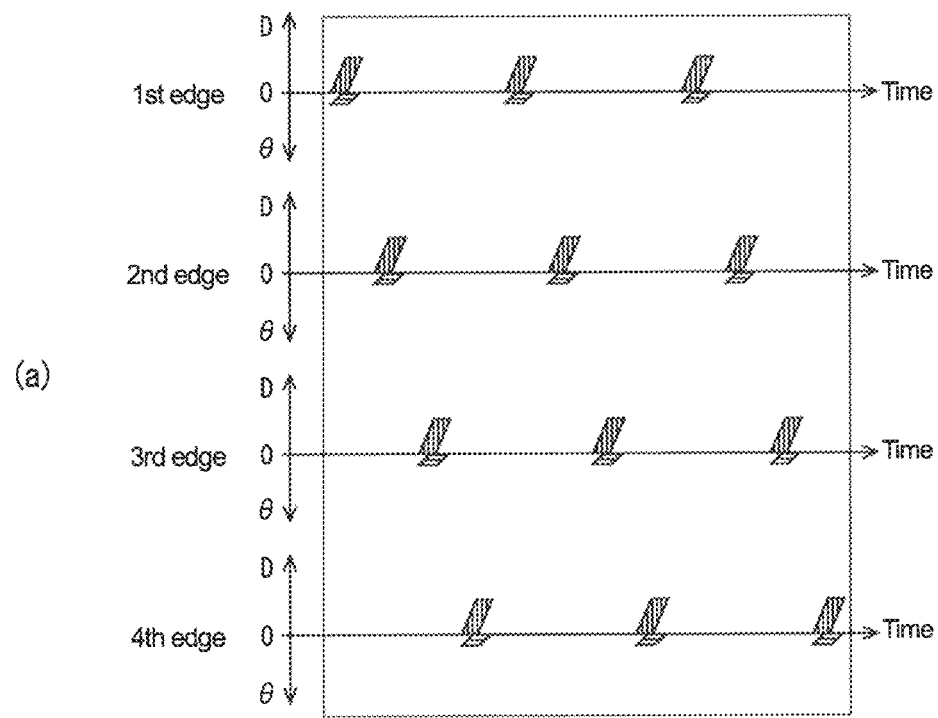
(a)
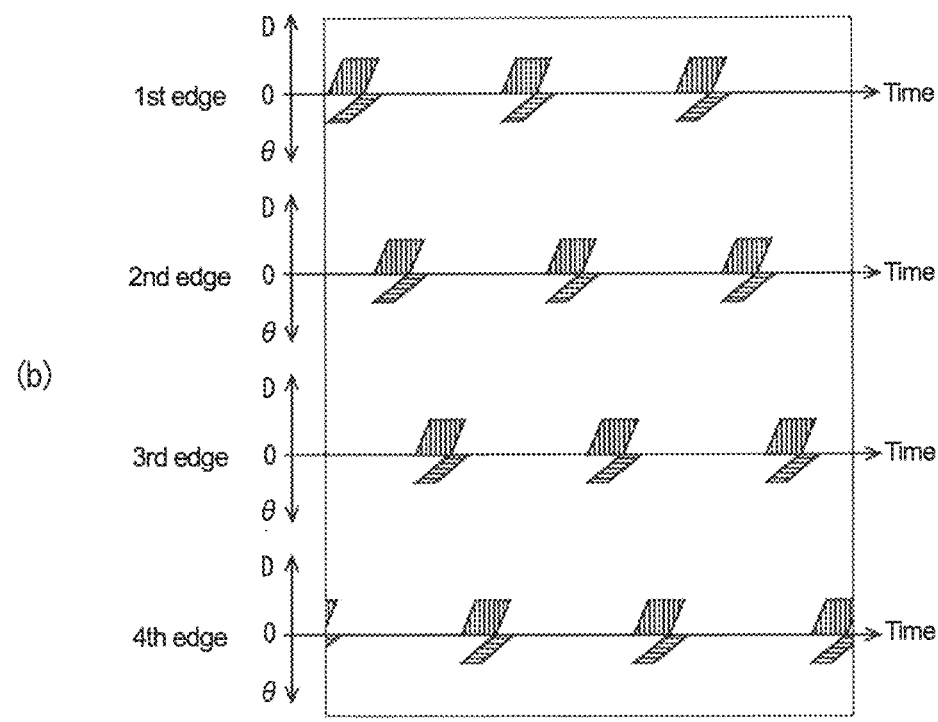
(b)

FIG.14
(a)
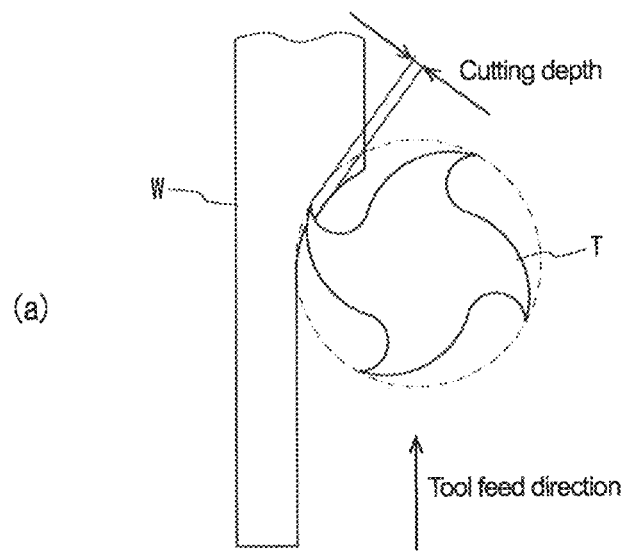
(b)
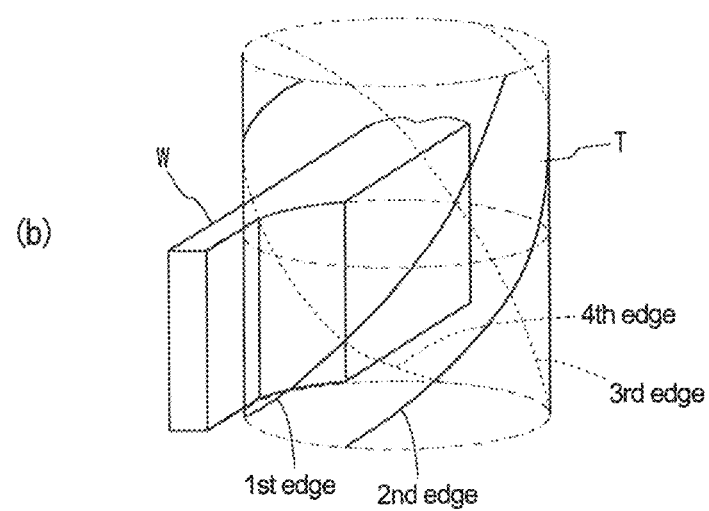

FIG. 15
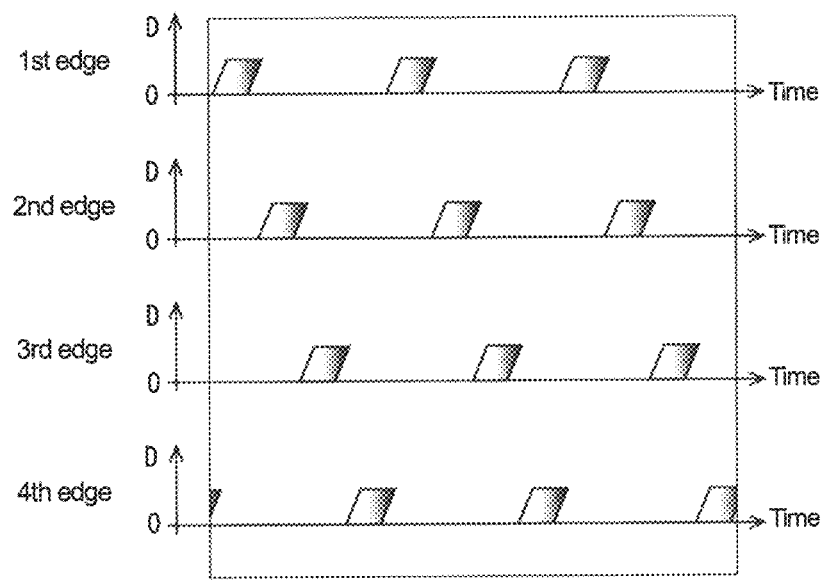
FIG. 16
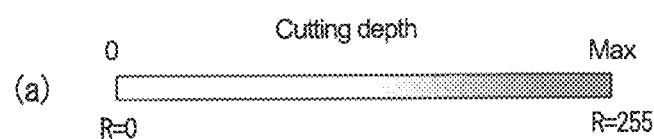
(a)
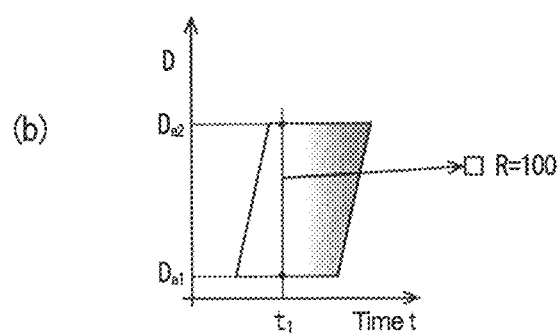
(b)

FIG. 17
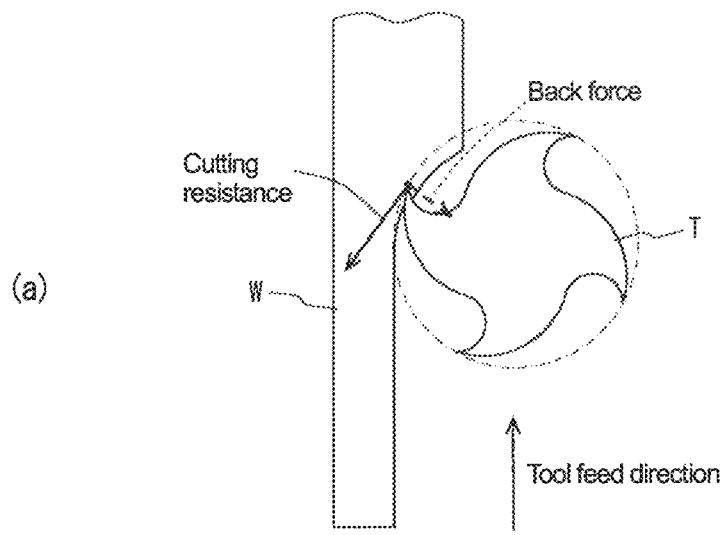
(a)
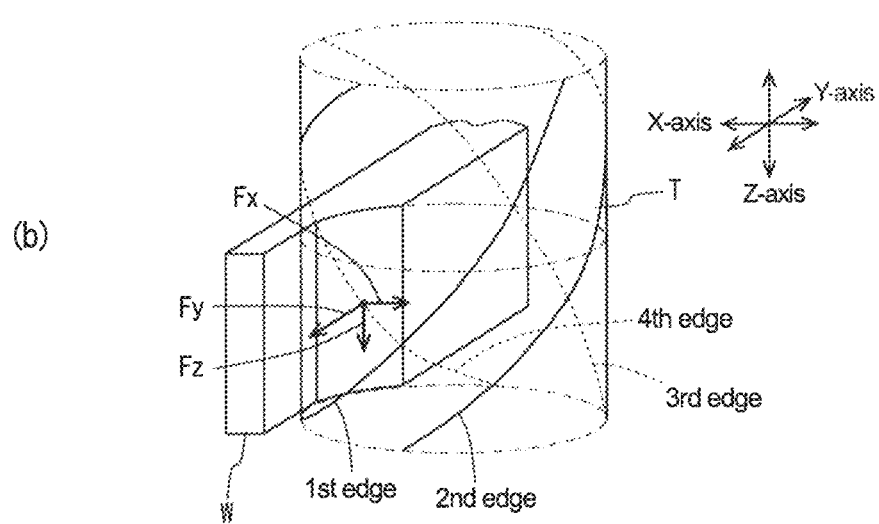
(b)

FIG.18
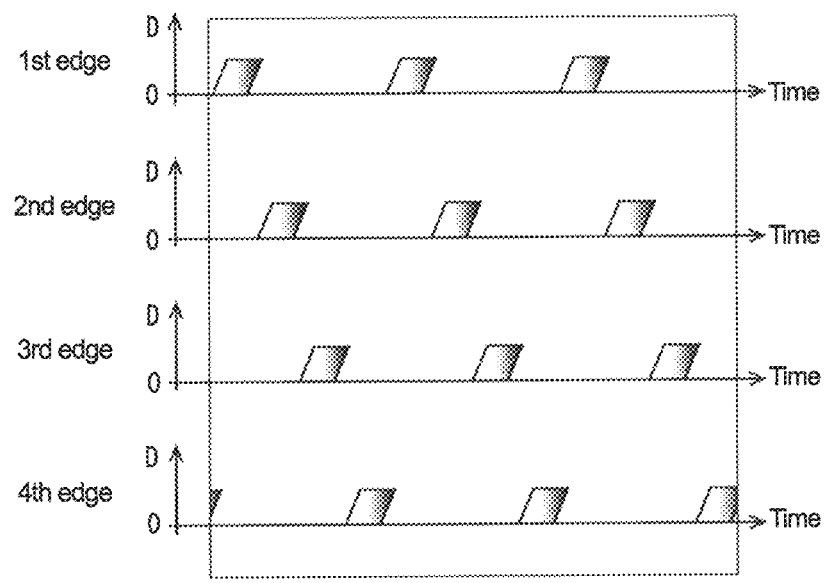
FIG.19
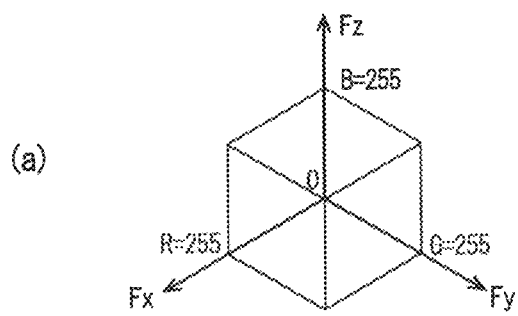
(a)
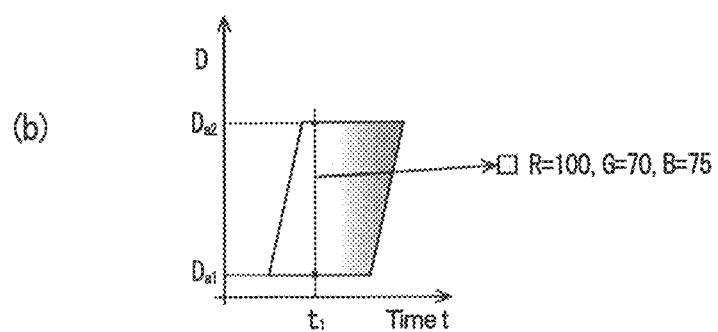
(b)

MACHINING STATE INFORMATION ESTIMATION DEVICE AND MACHINING STATE DIAGNOSIS APPARATUS

TECHNICAL FIELD

The present invention relates to a machining state information estimation device that estimates machining state information in virtual machining of a workpiece based on control information to be used in machining in an NC machine tool and converts the machining state information into an image, and also relates to a machining state diagnosis apparatus including the machining state information estimation device.

BACKGROUND ART

In the field of NC machine tools, motion mechanisms of an NC machine tool are controlled in accordance with an NC program so that desired machining is carried out. In order to realize optimum machining, various attempts have been made to predict an actual machining state. One of such attempts is a cutting load prediction system as disclosed in Patent Literature 1 listed below.

The cutting load prediction system described in Patent Literature 1 predicts a cutting load to be applied to a cutting tool in a machine tool cutting a workpiece by moving the cutting tool based on NC data. This cutting load prediction system includes NC data determining means determining the NC data on which the cutting load prediction is based, idling conducting means causing the machine tool to carry out a cutting process based on the determined NC data in the form of idling that involves no cutting, motion data obtaining means obtaining predetermined motion data concerning the cutting tool, including tool positions which the cutting tool passes through, during the cutting process, and cutting load predicting means calculating, based on the obtained motion data, a cutting load to be applied to the cutting tool when the machine tool performs the cutting process on a workpiece based on the NC data.

Since this cutting load prediction system is configured to obtain actual motion data (movement trajectory and feed speed) concerning the cutting tool by causing the machine tool to carry out the idling in which the cutting tool is moved based on the NC data, and predict a cutting load to be applied to the cutting tool based on the obtained accurate actual motion data, the accuracy of the cutting load prediction is significantly improved as compared with conventional cutting load prediction by simulation based on NC data, i.e., cutting load prediction in which an actual moving trajectory (tool trajectory) in the machine tool is not taken into account at all.

CITATION LIST

Patent Literature

Patent Literature 1: Japanese Unexamined Patent Application Publication No. 2017-72880

SUMMARY OF INVENTION

Technical Problem

The above-described cutting load prediction system disclosed in Patent Literature 1 is capable of accurately predicting a cutting load to be applied to a cutting tool. However, the state of the cutting load to be applied to the cutting tool is just one of phenomena occurring in the performed cutting operation; therefore, it is impossible to objectively recognize the state of machining in terms of the other phenomena.

As a result of intensive studies on a representing manner which enables the state of machining in an NC machine tool performing machining in accordance with an NC program containing information such as tool movement path and the like to be visually and objectively recognized, the inventors found out that estimating information on the state of machining that varies with time and converting the estimated machining state information into an image enables the machining state to be represented in relation to more factors.

The present invention has been achieved in view of the above-described background, and an object of the invention is to provide a machining state information estimation device which is capable of converting information on a machining state in machining performed by an NC machine tool into an image and to provide a machining state diagnosis apparatus inducing this machining state information estimation device.

Solution to Problem

To solve the above-described problem, the present invention provides a machining state information estimation device including:

an information storage storing control information to be used in machining in an NC machine tool, information on a workpiece to be machined in the NC machine tool, and information on a tool to be used in the NC machine tool;

a machining state information estimator configured to arrange, in a virtual space, a virtual workpiece set based on the information on the workpiece stored in the information storage and a virtual tool set based on the information on the tool stored in the information storage in such a manner that the virtual workpiece and the virtual tool have a positional relation identical to a positional relation based on the control information, and then relatively move the arranged virtual workpiece and virtual tool in accordance with the control information stored in the information storage and estimate a machining state in virtual machining of the workpiece in accordance with relative movement of the workpiece and tool; and an image data generator configured to, based on machining state information along time axis estimated by the machining state information estimator, generate image data for representing a relation between time and the machining state information as an image.

In this machining state information estimation device, control information to be used in machining in an NC machine tool, information on a workpiece to be machined in the NC machine tool, and information on a tool to be used in the machining are stored in advance into the information storage.

Thereafter, the machining state information estimator estimates machining state information based on the control information, information on the workpiece, and information on the tool stored in the information storage.

Specifically, the machining state information estimator arranges, in a virtual space, a virtual workpiece set based on the information on the workpiece stored in the information storage and a virtual tool set based on the information on the tool stored in the information storage in such a manner that the virtual workpiece and the virtual tool have a positional relation identical to a positional relation based on the control information, and then relatively moves the arranged virtual workpiece and virtual tool in accordance with the control information stored in the information storage and estimates a machining state in virtual machining of the workpiece in accordance with relative movement of the workpiece and tool.

Based on machining state information along time axis estimated by the machining state information estimator, the image data generator generates image data for representing a relation between time and the machining state information as an image.

Note that the control information contains at least information necessary for machining, such as tool movement path, tool movement speed, and tool rotation speed. For example, the control information contains at least one from among an NC program containing such kinds of information, tool path data before conversion into an NC program, servo command data, and servo feedback data.

Thus, with the machining state information estimation device according to the present invention, image data for representing machining state information along time axis in machining of the workpiece, which is machined by relatively moving the tool and the workpiece in accordance with the control information, as an image is generated; therefore, it is possible to objectively recognize the machining state by looking at the image along time axis.

In the present invention, the machining state information estimator may be configured to estimate, as the machining state information, machining state information including at least one selected from among information on a contact state between the tool and the workpiece in a direction of contact depth between the tool and the workpiece, information on a contact state between the tool and the workpiece in a direction of rotation of the tool, information on a cutting resistance applied to the tool, information on surface roughness of the workpiece, and information on a cutting depth in the direction of rotation of the tool.

Especially, in the case of converting information on the contact state between the tool and the workpiece in the direction of contact depth between the tool and the workpiece into an image, it is possible to objectively recognize the time when the tool and the workpiece are in contact with each other as well as their contact state in the contact depth direction. Recognizing this contact state enables estimation of the state of a load applied to the tool. Further, in the case of the tool having multiple cutting edges, the image data generator may be configured to generate image data representing the contact state information in the contact depth direction along time axis for each cutting edge.

Note that, in the case of the image showing the contact state between the tool and the workpiece in the contact depth direction along time axis, it is possible to reversely recognize the shape of the workpiece being machined by the tool, the movement path for the tool, etc. by analyzing the image together with information such as the diameter of the tool and the rotating speed of the tool. Furthermore, it is possible to regenerate the NC program used in the machining by analyzing the path on which the tool moves. Therefore, even if the NC program is lost for some reason, the lost NC program can be regenerated by analyzing the image that shows the relation between time and the contact state information corresponding to the NC program.

Further, in the present invention, the image data generator may be configured to generate, as the image data, image data including at least data (information) on a color for representing the machining state. Representing the machining state information as such an image including at least information on a color enables various kinds of machining state information to be represented as an image.

Further, in the present invention, the machining state information estimation device may be configured such that:

the image data generator is configured to generate, as the image data, color image data composed of multiple color elements; and the machining state information estimator is configured to estimate, as the machining state information, machining state information including a number of pieces of information corresponding to a number of said color elements and selected from among information on a contact state between the tool and the workpiece in a direction of contact depth of the tool and the workpiece, information on a contact state between the tool and the workpiece in a direction of rotation of the tool, information on a cutting resistance applied to the tool, information on surface roughness of the workpiece, and information on a cutting depth in the direction of rotation of the tool. In this case, the color elements are assigned respectively with one of the pieces of information estimated by the machining state information estimator. With this configuration, it is possible to represent the machining state information as an image which allows the pieces of information to be clearly distinguished (recognized).

Further, it is preferred that the machining state information estimation device according to the present invention includes a display unit configured to, based on the image data generated by the image data generator, display an image corresponding to the image data. Displaying the image on the display unit facilitates checking of the machining state.

The present invention further provides a machining state diagnosis apparatus including:

any one of the above-described machining state information estimation devices;

a learning information storage storing relationship information associating estimated machining state information estimated when virtually machining the workpiece using the control information for estimation with actual machining state information obtained when performing actual machining using the control information for estimation, the relationship information being learned empirically; and a machining state diagnosis unit configured to diagnose whether a machining state in actual machining using predetermined machining information is appropriate or not, based on machining state information obtained during the actual machining using the predetermined control information, estimated machining state information estimated based on the predetermined control information by the machining state information estimator of the machining state information estimation device, and the relationship information stored in the learning information storage.

In this machining state diagnosis apparatus, first, for multiple sets of control information, relationship between actual machining state information obtained when performing actual machining using each set of control information and estimated machining state information estimated based on a corresponding set of control information by the machining state information estimator is learned and relationship information obtained from the leaning is stored into the learning information storage.

Thereafter, when machining is performed using a predetermined set of control information, the machining state diagnosis apparatus diagnoses whether a machining state in the actual machining is appropriate or not, i.e., whether the machining state is normal or not, based on machining state information obtained during the actual machining, estimated machining state information estimated based on a corresponding set of control information by the machining state information estimator, and the relationship information stored in the learning information storage.

For example, when machining state information obtained during machining performed using a predetermined set of control information exceeds an allowable range that is set with respect to standard actual machining state information derived from estimated machining state information estimated based on a corresponding set of control information and the relationship information, the machining state diagnosis apparatus makes a diagnosis that the machining state in the machining is abnormal. On the other hand, when the machining state information obtained in the machining is within the allowable range, the machining state diagnosis apparatus makes a diagnosis that the machining state is normal.

The state of machining in an NC machine tool varies in accordance with, for example, a contact state between the tool and the workpiece, and also varies in accordance with the state of wear of the tool or the like. With this machining state diagnosis apparatus, previously obtained learning results concerning the machining state that varies in accordance with a contact state between the tool and the workpiece or the like are taken into account to judge whether the machining state is normal or not, so that an accurate machining state diagnosis is made.

Advantageous Effects of Invention

As described above, with the machining state information estimation device according to the present invention, machining state information along time axis in machining the workpiece by relatively moving the tool and the workpiece in accordance with the control information is converted into an image, so that it is possible to objectively recognize the machining state by looking at the image along time axis.

Especially, in the case of converting machining state information concerning a contact state between the tool and the workpiece in a direction of contact depth between the tool and the workpiece into an image, it is possible to objectively recognize the time when the tool and the workpiece are in contact with each other as well as their contact state in the contact depth direction. Recognizing this contact state enables estimation of the state of a load applied to the tool.

Further, in the case of the image showing the contact state between the tool and the workpiece in the contact depth direction along time axis, it is possible to reversely recognize the shape of the workpiece being machined by the tool, the movement path for the tool, etc. by analyzing the image, which shows the contact depth along time axis, together with information such as the diameter of the tool and the rotating speed of the tool. Furthermore, it is possible to regenerate the NC program used in the machining by analyzing the path on which the tool moves.

Further, with the machining state diagnosis apparatus according to the present invention, the state of machining that varies in accordance with a contact state between the tool and the workpiece is previously learned and the results of the learning are taken into account to judge whether the machining state is normal or not, so that an accurate machining state diagnosis is made.

BRIEF DESCRIPTION OF DRAWINGS

FIG. 10 is an illustrative diagram for explaining a contact state in depth direction in the first embodiment;

FIG. 11 is an illustrative diagram for explaining conversion of contact state information into an image in the first embodiment;

FIG. 13 shows (a) an enlarged view of the part a in FIG. 12 and (b) an enlarged view of the part b in FIG. 12;

FIG. 14 is an illustrative diagram for explaining machining state information in Variation 1 of the first embodiment;

FIG. 15 is an illustrative diagram showing an image of the machining state information in Variation 1 of the first embodiment;

FIG. 16 is an illustrative diagram for explaining conversion of the machining state information into the image in Variation 1 of the first embodiment;

FIG. 17 is an illustrative diagram for explaining machining state information in Variation 2 of the first embodiment;

FIG. 18 is an illustrative diagram showing an image of the machining state information in Variation 2 of the first embodiment;

FIG. 19 is an illustrative diagram for explaining conversion of the machining state information into the image in Variation 2 of the first embodiment;

DESCRIPTION OF EMBODIMENTS

Hereinafter, specific embodiments of the present invention will be described with reference to the drawings.

First Embodiment

Figure 1:
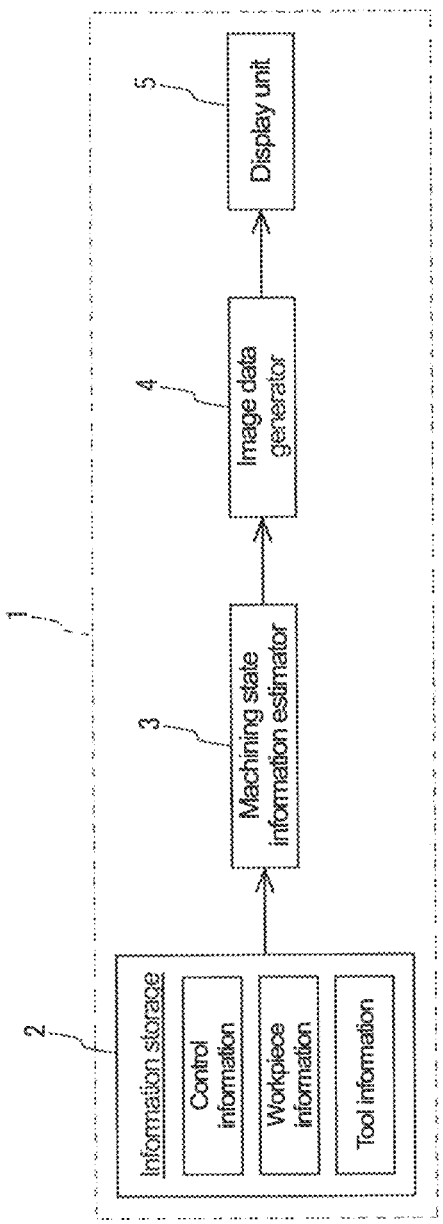
FIG. 1 is a block diagram schematically illustrating a configuration of a contact state estimation device according to a first embodiment of the present invention.

First, a machining state information estimation device according to a first embodiment of the present invention is described on the basis of FIGS. 1 to 13. As illustrated in FIG. 1, the machining state information estimation device 1 according to this embodiment consists of an information storage 2, a machining state information estimator 3, an image data generator 4, and a display unit 5. The machining state information estimation device 1, except for the display unit 5, is composed of a computer including a CPU, a RAM, and a ROM. The machining state information estimator 3 and the image data generator 4 are functionally implemented by a computer program to carry out the processes described later. The information storage 2 is composed of an appropriate storage medium, such as a RAM. The display unit 5 is composed of a display such as a touch panel.

The information storage 2 previously stores control information to be used in machining in an NC machine tool, information on a workpiece to be machined in the NC machine tool (workpiece information), and information on a tool to be used in the NC machine tool (tool information). Note that the control information contains at least information such as tool movement path, tool movement speed, and tool rotation speed. For example, the control information contains at least one from among an NC program containing such kinds of information, tool path data before conversion into an NC program, servo command data, and servo feedback data. The workpiece information includes at least information on the dimensions and shape of the workpiece. The tool information includes at least information on specifications of the tool, such as tool type, number of cutting edges, cutting-edge helix angle, and nominal diameter (effective cutting diameter).

The machining state information estimator 3 first sets a virtual workpiece model and a virtual tool model based on the workpiece information and tool information stored in the information storage 2, and arranges the set virtual workpiece model and virtual tool model in a virtual space in such a manner that they have a positional relation identical to a positional relation for arranging them in the NC machine tool, in other words, a positional relation identical to a positional relation based on the control information. Subsequently, the machining state information estimator 3 relatively moves the arranged virtual workpiece model and virtual tool model in accordance with the control information stored in the information storage 2, and estimates contact state information indicative of the state of contact between the tool and the workpiece as machining state information in accordance with the relative movement of the tool and workpiece.

Figure 2:
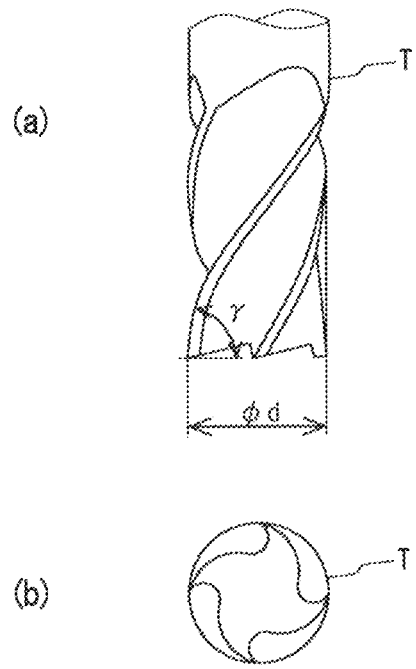
FIG. 2 shows (a) a front view of a tool to be used in the first embodiment and (b) a bottom view of the tool.
Figure 3:
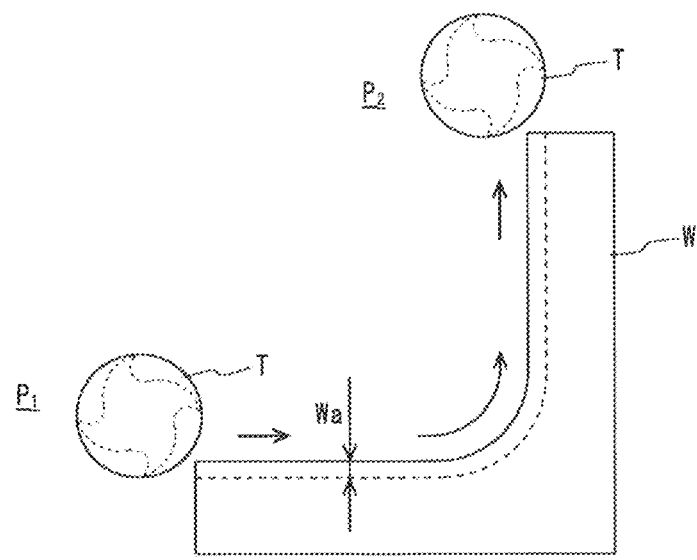
FIG. 3 is a plan view illustrating a workpiece to be machined in the first embodiment.

The process in the machining state information estimator 3 is specifically described below using an example in which a workpiece W illustrated in FIG. 3 is machined by a tool T illustrated in FIG. 2. The tool T illustrated in FIG. 2 is an endmill that has a nominal diameter of φd, four cutting edges, and a cutting-edge helix angle of γ. The workpiece W illustrated in FIG. 3 has a hook-shaped planar shape, and has a cutting allowance Wa, indicated by a broken line, set along the inside surface of the hook shape thereof, which is cut by moving the tool T from the position indicated by $P_1$ to the position indicated by $P_2$ along the direction indicated by arrows.

As described above, the machining state information estimator 3 first arranges the tool T and the workpiece W in a virtual space in such a manner that the workpiece W and the tool T have a predetermined positional relation, i.e., in such a manner that the tool T is positioned at $P_1$ in FIG. 3

Subsequently, the machining state information estimator 3 moves a model of the tool T (hereinafter, simply referred to as "the tool T") relative to a model of the workpiece W (hereinafter, simply referred to as "the workpiece W") in accordance with a rotation speed, a feed speed, and a movement path (the direction indicated by arrows) contained in the control information stored in the information storage 2, and estimates contact state information concerning the tool T and the workpiece W.

The estimated contact state information concerning the tool T and the workpiece W includes contact state information in depth direction that is indicative of a contact state in a depth direction between each cutting edge of the tool T and the workpiece W and contact state information in rotation direction that is indicative of a contact state in a direction of rotation of the tool T between each cutting edge of the tool T and the workpiece W. Both the contact state information in depth direction and the contact state information in rotation direction vary with time.

Figure 4:
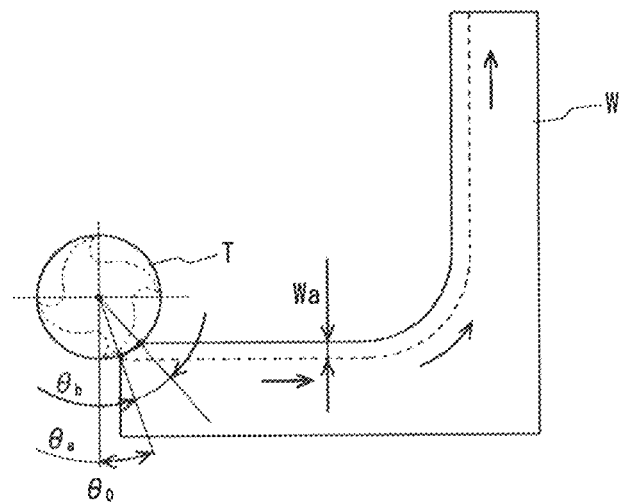
FIG. 4 is an illustrative diagram showing a manner of machining in the first embodiment.

The contact state information in depth direction is, as illustrated in FIG. 10, represented by, for each cutting edge, a lowest height dimension $D_a$ and a highest height dimension $D_b$ of the cutting edge in contact with the workpiece W. The contact state information in rotation direction is, as illustrated in FIG. 4, represented by, for each cutting edge, a phase (angle) $(\theta_b+\theta_a)$ and a phase (angle) $\theta_a$ that are respectively the farthest from and the nearest to a reference phase $\theta_0$ (=0) in the state where the cutting edge is in contact with the workpiece W. Note that both the contact state information in depth direction and the contact state information in rotation direction are estimated taking into account the helix angle γ of the tool T.

While moving the tool T relative to the workpiece W from the position $P_1$ to the position $P_2$ along the direction indicated by arrows in FIG. 3 (see FIGS. 4 to 9), the machining state information estimator 3 estimates the contact state information in depth direction $(D_a, D_b)$ and the contact state information in rotation direction $(\theta_a, (\theta_a+\theta_b))$ at predetermined time intervals.

Figure 5:
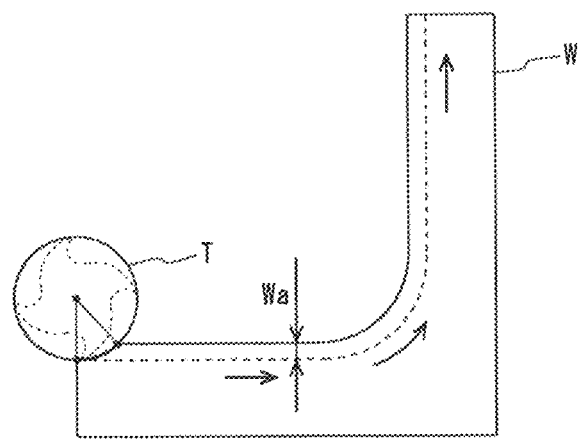
FIG. 5 is an illustrative diagram showing the manner of machining in the first embodiment.
Figure 6:
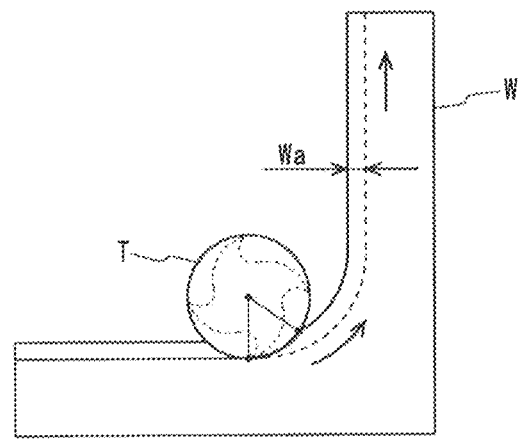
FIG. 6 is an illustrative diagram showing the manner of machining in the first embodiment.
Figure 7:
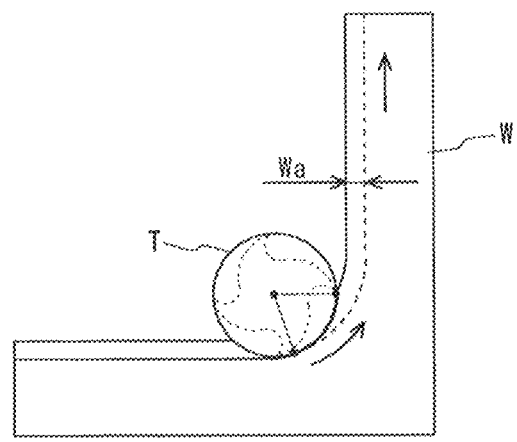
FIG. 7 is an illustrative diagram showing the manner of machining in the first embodiment.
Figure 8:
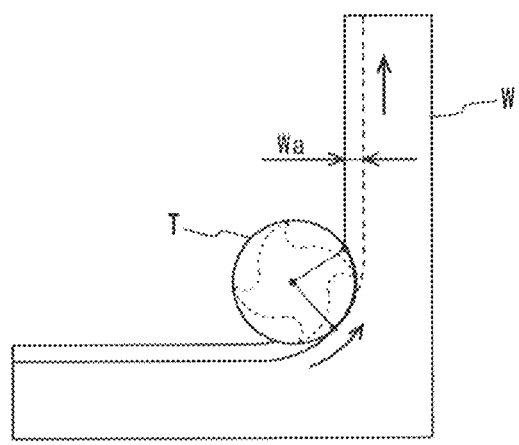
FIG. 8 is an illustrative diagram showing the manner of machining in the first embodiment.
Figure 9:
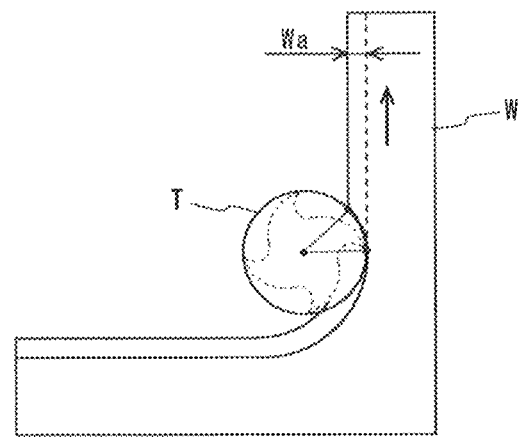
FIG. 9 is an illustrative diagram showing the manner of machining in the first embodiment.

FIG. 4 shows a state where the tool T comes into contact with the workpiece W to start machining of the workpiece W. FIG. 5 shows a state where the tool T has cut the full cutting allowance Wa set on the workpiece W. FIG. 6 shows a state where the tool T has reached a position before the inside corner of the workpiece W. FIG. 7 shows a state where the tool T has started to cut the inside corner of the workpiece W. FIG. 8 shows a state where the tool T has reached the center of the inside corner of the workpiece W. FIG. 9 shows a state where the tool T has moved past the inside corner of the workpiece W.

As can be seen from FIGS. 4 and 10, after the tool T comes into contact with the workpiece W, the contact state information in depth direction $D_a$ and $D_b$ relatively reach the minimum value of 0 and the maximum value equal to a cutting depth $D_p$, and a time period where $D_a$ is 0 and a time period where $D_b$ is equal to $D_p$ last for a certain time. These time periods become longer and longer until the state shown in FIG. 5 where the tool T has cut the full cutting allowance Wa set on the workpiece W is reached. Thereafter, these time periods remain constant until the tool T reaches the inside corner of the workpiece W. On the other hand, the contact state information in rotation direction $\theta_a$ and $\theta_b$ vary as follows: $\theta_a$ becomes smaller and smaller while $\theta_b$ becomes larger and larger; and after the state shown in FIG. 5 is reached, $\theta_a$ and $\theta_b$ each have a constant value until the tool T reaches the inside corner of the workpiece W, during which $\theta_a$ is 0.

Thereafter, the contact state information in depth direction $D_a$ and $D_b$ vary as follows: the time period where $D_a$ is 0 and the time period where $D_b$ is equal to $D_p$ become longer and longer until the tool T reaches the center of the inside corner of the workpiece W as shown in FIGS. 6 to 8, and then become shorter and shorter until the state shown in FIG. 9 where the tool T has moved past the inside corner is reached. On the other hand, the contact state information in rotation direction $\theta_a$ and $\theta_b$ vary as follows: $\theta_a$ and $\theta_b$ become larger and larger while the tool T shifts from the state shown in FIG. 6 to the state shown in FIG. 8; and then until the state shown in FIG. 9 is reached, $\theta_a$ becomes larger and larger while $\theta_b$ becomes smaller and smaller.

Thereafter, in the process where the tool T moves in the arrow direction from the state shown in FIG. 9, the contact state information in depth direction $D_a$ and $D_b$ vary as follows: the time period where $D_a$ is 0 and the time period where $D_b$ is equal to $D_p$ remain constant while the tool T is cutting the full cutting allowance Wa; thereafter, these time periods become shorter and shorter as the tool T moves away from the workpiece W; and then both $D_a$ and $D_b$ turn into 0 when the tool T separates from the workpiece W. On the other hand, the contact state information in rotation direction $\theta_a$ and $\theta_b$ vary as follows: $\theta_a$ and $\theta_b$ remain constant while the tool T is cutting the cutting workpiece Wa; thereafter, $\theta_b$ becomes smaller and smaller with $\theta_a$ remaining constant as the tool T moves away from the workpiece W; and then both $\theta_a$ and $\theta_b$ turn into 0.

The image data generator 4 carries out an image data generation process based on the contact state information in depth direction ($D_a$, $D_b$) and contact state information in rotation direction ($\theta_a$, ($\theta_a+\theta_b$)) estimated by the machining state information estimator 3 in order to represent them as an image (in this embodiment, a figure).

Specifically, the image data generator 4 generates image data for representing the contact state information in depth direction and the contact state information in rotation direction as images as shown in FIG. 11. FIG. 11(a) shows the contact state information in depth direction ($D_a$, $D_b$) converted into an image. The figure (image) of a parallelogram shape as shown in FIG. 11(a) is obtained by plotting the lowest height dimension $D_a$ and highest height dimension $D_b$ of a cutting edge in accordance with the lapse of time t with the lowest height dimension and highest height dimension at time $t_1$ being respectively represented by $D_{a1}$ and $D_{b1}$.

FIG. 11(b) shows the contact state information in rotation direction ($\theta_a$, ($\theta_a+\theta_b$)) converted into an image. The figure (image) of a parallelogram as shown in FIG. 11(b) is obtained by plotting the contact phase $\theta_a$ and contact phase ($\theta_a+\theta_b$) of a cutting edge in accordance with the lapse of time t with the nearest and farthest contact phases with respect to the reference phase $\theta_0$ at time $t_1$ being respectively represented by $\theta_{a1}$ and ($\theta_{a1}+\theta_{b1}$).

Figure 12:
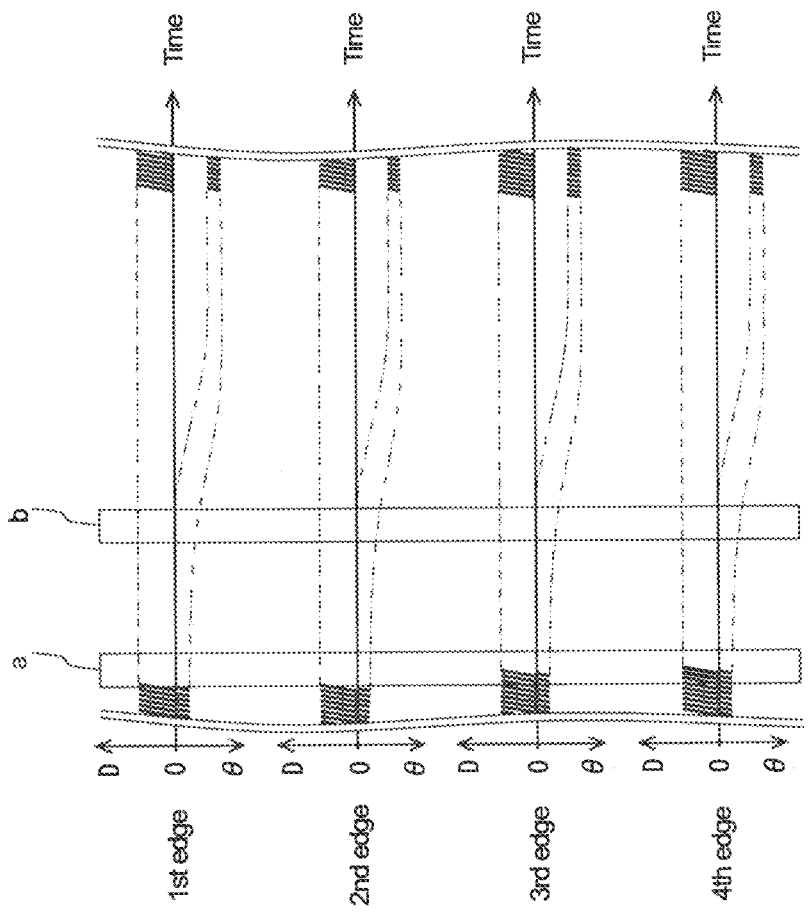
FIG. 12 is an illustrative diagram showing the image of the contact state information in the first embodiment.

The image data generator 4 generates image data as shown in FIG. 12 in which, for each of the first through fourth cutting edges, the images of the contact state information in depth direction and contact state information in rotation direction that both vary with time are combined together.

In FIG. 12, the part a corresponds to the contact state information obtained when the tool T is positioned around the position indicated in FIG. 5, and the part b corresponds to the contact state information obtained when the tool T is positioned around the position indicated in FIG. 6. FIG. 13(a) shows an enlarged view of the part a in FIG. 12 with the time axis enlarged. FIG. 13(b) shows an enlarged view of the part b in FIG. 12 with the time axis enlarged. As can be seen from FIG. 13, as for the contact state information in depth direction $D_a$ and $D_b$, the time period where $D_a$ is 0 and the time period where $D_b$ is equal to $D_p$ when the tool T is positioned around the position indicated in FIG. 6 are longer than those when the tool T is positioned around the position indicated in FIG. 5. On the other hand, as for the contact state information in rotation direction $\theta_a$ and $\theta_b$, the value of $\theta_b$ when the tool T is positioned around the position indicated in FIG. 6 is larger than that when the tool T is positioned around the position indicated in FIG. 5.

The image generated by the image data generator 4 as shown in FIG. 12 is to be displayed on the display unit 5.

In the machining state information estimation device 1 according to this embodiment having the above-described configuration, first, the machining state information estimator 3 relatively moves a virtual workpiece W and a virtual tool T in accordance with the control information based on the workpiece information, tool information, and control information stored in the information storage 2 to estimate contact state information in depth direction ($D_a$, $D_b$) and contact state information in rotation direction ($\theta_a$, ($\theta_a+\theta_b$)) concerning the tool T and the workpiece W.

Subsequently, based on the contact state information in depth direction ($D_a$, $D_b$) and contact state information in rotation direction ($\theta_a$, ($\theta_a+\theta_b$)) estimated by the machining state information estimator 3, the image data generator 4 generates an image along time axis that shows the contact state information in depth direction ($D_a$, $D_b$) and the contact state information in rotation direction ($\theta_a$, ($\theta_a+\theta_b$)). The generated image is displayed on the display unit 5.

As described above, this machining state information estimation device 1 is configured such that contact state information in depth direction ($D_a$, $D_b$) and contact state information in rotation direction ($\theta_a$, ($\theta_a+\theta_b$)) concerning contact between each cutting edge of the tool T and the workpiece W in relatively moving the tool T and the workpiece W in accordance with the control information are converted into an image along time axis and the image is displayed on the display unit 5. Therefore, it is possible to objectively recognize the time when each cutting edge of the tool T is in contact with the workpiece W as well as their contact state in depth direction and contact state in rotation direction by looking at the image along time axis. Further, recognizing these contact states enables estimation of the state of a load applied to the tool T.

Further, since the image shows the contact state in depth direction and contact state in rotation direction between the tool T and the workpiece W along time axis, it is possible to reversely recognize the shape of the workpiece W being machined by the tool T, the movement path for the tool T, etc. by analyzing the image together with information such as the nominal diameter of the tool T and the rotating speed of the tool T. Furthermore, it is also possible to regenerate the NC program used in the machining by analyzing the path on which the tool T moves. Therefore, even if the NC program is lost for some reason, the lost NC program can be regenerated by analyzing the image (contact state image) that shows the relation between time and the contact state information corresponding to the NC program.

Note that the machining state information estimation device according to the above-described first embodiment is configured such that the contact state information concerning the tool and the workpiece as machining state information is converted into an image; however, the machining state information to be converted into an image is not limited to such contact state information and may be information on a cutting resistance applied to the tool, information on surface roughness of the workpiece, or information on a cutting depth in the direction of rotation of the tool. Further, the image is not limited to an image as described above in which a machining state information feature is represented as a figure. The image may be an image which includes information on a color. Furthermore, the image may be an image which includes multiple color elements. The following is description of such variations.

Variation 1 of First Embodiment

Variation 1 of the first embodiment is configured such that information on a cutting depth in the direction of rotation of the tool as machining state information is converted into an image using color information.

As illustrated in FIGS. 14(a) and 14(b), where the workpiece W is machined by moving the tool T as an endmill with four helical flutes (cutting edges) in a feed direction that is indicated by an arrow, a cutting depth (cutting amount) of each cutting edge (each of the first through fourth cutting edges) gradually increases after the cutting edge comes into contact with the workpiece W. Thereafter, the cutting edge separates from the workpiece W and comes into a non-contact state. The state where each cutting edge is in contact with the workpiece W is a piece of machining state information, and this contact state information can be represented as a figure of a parallelogram shape as described above in the first embodiment. In addition to this, variation in the cutting amount along time axis can be represented as a single-color gradation or a change of color within the figure.

FIG. 15 shows an example in which variation in the cutting amount along time axis is represented as a single-color gradation. As shown in FIG. 16(a), brightness of a color (this example uses red) is divided into 256 levels, and the maximum cutting amount is assigned with a brightness of 255 and the zero cutting amount is assigned with a brightness of 0. In FIG. 16(b), the point with a brightness of 100 at time $t_1$ indicates that the cutting amount is 39% relative to the maximum cutting amount. Representing the cutting amount as a color gradation in this manner enables variation in the cutting amount to be easily and objectively recognized. Further, it is also enabled to represent variation in the cutting amount caused by an irregular pitch endmill, eccentricity of the tool T, variation in tool rotation speed, vibration, or any other phenomenon.

It should be appreciated that examples of the above-described color gradation include a grayscale. Further, in the case where variation in the cutting amount along time axis is represented as a change of color, it may be represented as a change of hue. For example, in the case of using the RGB color system, variation in the cutting amount along time axis can be represented as a change of color in 256 or more levels with the zero cutting amount assigned with blue (B), the maximum cutting amount assigned with red (R), and the intermediate value between the zero and maximum cutting amounts assigned with green (G). Further, it also should be appreciated that variation in the cutting amount along time axis may be represented with other kinds of color space, such as the CMYK color system or the YUV color system. Note that the color gradations in FIGS. 15 and 16 are represented using a grayscale for the sake of expedience.

Variation 2 of First Embodiment

Variation 2 of the first embodiment is configured such that information on a cutting resistance applied to the tool as machining state information is converted into an image using color information.

As illustrated in FIGS. 17(a) and 17(b), where the workpiece W is machined by moving the above-described tool T in a feed direction that is indicated by an arrow, a cutting resistance is applied to each cutting edge (each of the first through fourth cutting edges). The cutting resistance applied to each cutting edge gradually increases with increase in the cutting amount after the cutting edge comes into contact with the workpiece W, and then the cutting resistance turns into 0 when the cutting edge separates from the workpiece W and comes into the non-contact state. This cutting resistance can be represented as component forces Fx, Fy, and Fz in the directions of X-axis, Y-axis, and Z-axis serving as movement axes for the tool T.

As described above, the contact state information for each cutting edge can be represented as a figure of a parallelogram shape. In addition to this, variation in each component force Fx, Fy, Fz of the cutting resistance along time axis can be represented as a change of color within the figure. It should be appreciated that the figure is not limited to a parallelogram shape and may be of any other shape that allows the figure to be distinguished from other areas.

In FIG. 18, variation in each component force Fx, Fy, Fz of the cutting resistance along time axis is represented as a change of color in the RGB color system. By way of example, as illustrated in FIG. 19(a), each component force Fx, Fy, Fz is represented as a change of color in 256 levels, wherein: R=255 is defined as indicating the time when Fx is equal to the maximum value therefor with Fy=0 and Fz=0; G=255 is defined as indicating the time when Fy is equal to the maximum value therefor with Fx=0 and Fz=0; and B=255 is defined as indicating the time when Fz is equal to the maximum value therefor with Fx=0 and Fy=0. The values of R, G, and B are assigned in accordance with the values of the component forces Fx, Fy, and Fz. For example, as illustrated in FIG. 19(b), the point where R=100, G=70, and B=75 at time $t_1$ indicates that Fx is 39% relative to the maximum value therefor, Fy is 27% relative to the maximum value therefor, and Fz is 29% relative to the maximum value therefor. Similarly to Variation 1 described above, it should be understood that each component force Fx, Fy, Fz in this variation also may be represented as a change of color in 256 or more levels and may be represented with other kinds of color space, such as the CMYK color system or the YUV color system. Further, the changes of color in FIGS. 18 and 19 are represented using a grayscale for the sake of expedience.

Representing the cutting resistance by a change of color in the this manner enables variation in the cutting resistance to be easily and objectively recognized. Further, it is also enabled to represent variation in the cutting resistance caused by an irregular pitch endmill, eccentricity of the tool T, variation in tool rotation speed, vibration, or any other phenomenon and to represent such variation in different coordinate systems, e.g., a tool coordinate system and a workpiece coordinate system. Note that FIGS. 17(a) and 17(b) illustrate a cutting resistance in up-cut milling; however, it should be appreciated that a cutting resistance in down-cut milling also can be represented in the same manner.

Variation 3 of First Embodiment

Variation 3 of the first embodiment is configured such that the image data generated for representing the machining state information as an image is compressed. In the above-described first embodiment in which information on the contact state between the tool T and the workpiece W (contact state information) is converted into an image, it is possible to compress the generated image data by representing the parallelogram figure in the image with color information.

Figure 20:
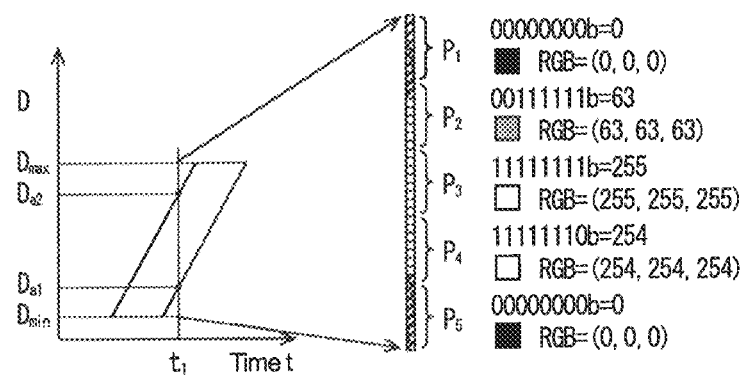
FIG. 20 is an illustrative diagram for explaining conversion of machining state information into an image in Variation 3 of the first embodiment.

A manner of the data compression is described on the basis of FIG. 20. As illustrated in FIG. 20, where the image is to be displayed in the area between $D_{max}$ and $D_{min}$ and each line along D-axis of the area is assigned with 40 pixels, the image data has lines along D-axis, each having 40-pixel data, arranged along time axis.

In the case where the area inside the parallelogram shape is displayed in white (the image data for white is "1") and the background is displayed in black (the image data for black is "0"), if the image on the line at time $t_1$ in FIG. 20 is such that 10 pixels, 21 pixels, and 9 pixels in sequence from top to bottom are respectively black, white, and black, the image data for this line is represented as "00000000, 00111111, 11111111, 11111110, 00000000". If each group of 8 pixels in sequence from top to bottom is represented as 1-byte data consisting of 8 bits, this image data is represented as "0, 63, 255, 254, 0". In this case, if this image data is represented as 24-bit color information with 8 bits per color, this image data can be represented as image data having 15 pieces of data, namely, RGB=(0,0,0), RGB=(63, 63,63), RGB=(255,255,255), RGB=(254,254,254), and RGB=(0,0,0) in sequence from top to bottom. Note that, similarly to Variations 1 and 2, the image data in this variation also may be represented as a change of color in 256 or more levels and may be represented with other kinds of color space, such as the CMYK color system or the YUV color system.

By representing the image data as 24-bit color information with 8 bits per color in this manner instead of representing it with "0" or "1" for each pixel, the image data is compressed. Further, representing the image data as color information enables conversion into image processing information suitable for machine learning. Furthermore, compressing the image data facilitates representation of the transition of the machining state information.

Note that, although FIG. 20 shows an example in which the image data is compressed in the cutting-edge depth direction, i.e., in the D-axis direction, it is also possible to compress the image data in the time axis direction. That is to say, it is possible to compress the image data two-dimensionally. Further, in the example shown in FIG. 20, it is also possible to represent several pieces of machining state information using color information, for example, by respectively assigning R, G, and B of color information to the contact state information, the cutting amount in the direction of rotation of the tool T, and the cutting resistance.

Second Embodiment

Figure 21:
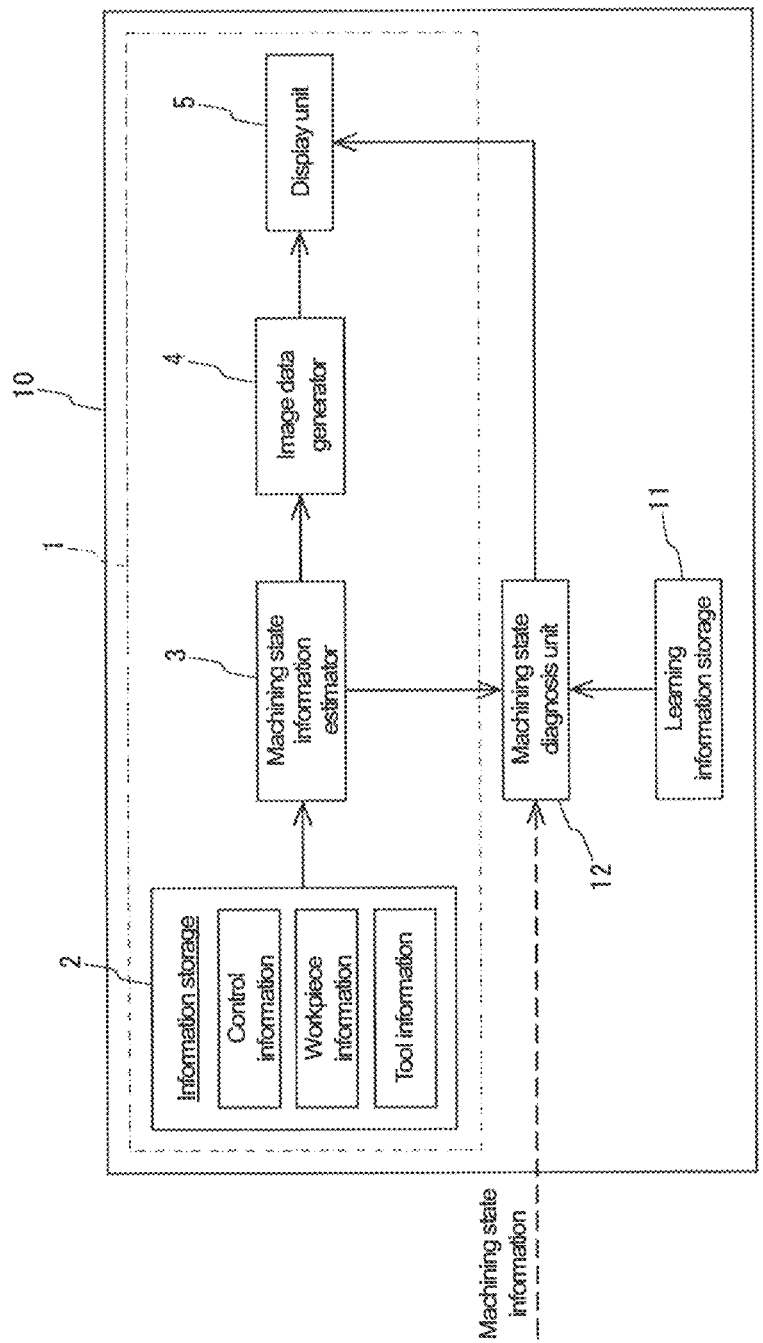
FIG. 21 is a block diagram schematically illustrating a configuration of a machining state diagnosis apparatus according to a second embodiment of the present invention.

Next, a machining state diagnosis apparatus according to a second embodiment of the present invention is described on the basis of FIG. 21. As illustrated in FIG. 21, the machining state diagnosis apparatus 10 according to this embodiment includes a machining state diagnosis unit 12 and a learning information storage 11 as well as the machining state information estimation device 1 according to the first embodiment. The machining state diagnosis unit 12, except for the display unit 5, is also composed of a computer including a CPU, a RAM, and a ROM. The machining state information estimator 3, the image data generator 4, and the machining state diagnosis unit 12 are functionally implemented by a computer program so that the machining state information estimator 3 and the image data generator 4 carry out the above-described processes and the machining state diagnosis unit 12 carries out the process described later. The information storage 2 and the learning information storage 11 are composed of an appropriate storage medium, such as a RAM. The display unit 5 is composed of a display such as a touch panel.

The learning information storage 11 is a functional unit that stores, for multiple sets of control information, relationship information indicative of relationship between actual machining state information obtained when performing actual machining using each set of control information in the NC machine tool and estimated machining state information estimated based on a corresponding set of control information by the machining state information estimator 3. The relationship information is stored in advance into the learning information storage 11 from the outside.

The relationship information is obtained, for example, through machine learning based on the actual machining state information that is obtained empirically when performing actual machining using each of multiple sets of control information in the NC machine tool and the estimated machining state information that is estimated based on a corresponding set of control information by the machining state information estimator 3. Note that the actual machining state information includes, but not limited to, for example, a cutting load detected by a measurement device (probe) provided in the NC machine tool and a vibration occurring in cutting.

When machining is performed using a predetermined set of control information in the NC machine tool, the machining state diagnosis unit 12 receives machining state information detected by the measurement device (probe) provided in the NC machine tool from the measurement device, diagnoses whether the machining being performed in the NC machine tool is in a normal state or not, based on the received machining state information, estimated machining state information estimated based on a corresponding set of control information by the machining state information estimator 3, and the relationship information stored in the learning information storage 11, and displays the diagnosis result on the display unit 5.

For example, when the machining state information obtained during the machining performed using the predetermined set of control information exceeds an allowable range that is set with respect to standard actual machining state information derived from the estimated machining state information estimated based on the corresponding set of control information and the relationship information, the machining state diagnosis unit 12 makes a diagnosis that the machining state in the machining is abnormal. On the other hand, when the machining state information is within the allowable range, the machining state diagnosis unit 12 makes a diagnosis that the machining state is normal.

In the machining state diagnosis apparatus 10 according to this embodiment having the above-described configuration, when machining is performed using a predetermined set of control information in the NC machine tool, first, the machining state information estimator 3 estimates estimated machining state information based on a set of control information identical to the predetermined set of control information. Subsequently, the machining state diagnosis unit 12 diagnoses whether the machining being performed in the NC machine tool is in a normal state or not, based on machining state information received from the measurement device (probe) provided in the NC machine tool, the estimated machining state information estimated by the machining state information estimator 3, and the relationship information stored in the learning information storage 11, and the diagnosis result is displayed on the display unit 5.

The state of machining in the NC machine tool varies in accordance with, for example, a contact state between the tool T and the workpiece W, and also varies in accordance with the state of wear of the tool T or the like. With this machining state diagnosis apparatus 10, the machining state that varies in accordance with a contact state between the tool T and the workpiece W or the like is previously learned and the results of the learning are taken into account to judge whether the machining state is normal or not, so that an accurate machining state diagnosis is made.

Hereinbefore, some embodiments of the present invention have been described. However, it should be understood that the present invention is not limited to the above-described first embodiment and variations thereof and the above-described second embodiment and can be implemented in other manners.

For example, the above-described embodiments mention information on the contact state between the tool T and the workpiece W in the direction of contact depth between the tool T and the workpiece W, information on the contact state between the tool T and the workpiece W in the direction of rotation of the tool, information on the cutting resistance applied to the tool T, information on surface roughness of the workpiece W, and information on the cutting depth in the direction of rotation of the tool as examples of the machining state information. However, the present invention is not limited to these kinds of information and may be configured such that information on chatter vibration of the tool is converted into an image. In such a case, a configuration is possible in which the vertical axis indicates the contact depth and the horizontal axis indicates time per chatter vibration period (=t/Tc). With this configuration, the horizontal axis corresponds to stability pocket number in the theory of stability pocket in regenerative chatter; therefore, the image data can be easily associated with the theory of stability pocket. Alternatively, a configuration is possible in which the vertical axis indicates the contact depth, the horizontal axis indicates time, and the pixels indicate rotation period per chatter vibration period. With this configuration, the pixels correspond to stability pocket number in the theory of stability pocket in chatter vibration; therefore, the image data in this configuration also can be easily associated with the theory of stability pocket.

Further, the above-described machining state diagnosis apparatus 10 is configured such that relationship information learned outside the apparatus is stored into the learning information storage 11. However, the machining state diagnosis apparatus 10 may include a learning unit carrying out a relationship-information learning process and be configured such that relationship information obtained through the learning process performed by the learning unit is stored into the learning information storage 11.

As already mentioned above, the foregoing description of the embodiments is not limitative but illustrative in all aspects. One skilled in the art would be able to make variations and modifications as appropriate. The scope of the invention is not defined by the above-described embodiments, but is defined by the appended claims. Further, the scope of the invention encompasses modifications made from the embodiments within the scope equivalent to the scope of the claims.

REFERENCE SIGNS LIST

1 Machining state information estimation device
2 Information storage
3 Machining state information estimator
4 Image data generator
5 Display unit
10 Machining state diagnosis apparatus
11 Learning information storage
12 Machining state diagnosis unit
T Tool
W Workpiece

The invention claimed is:

1. A machining state information estimation device comprising:
an information storage storing control information to be used in machining in an NC machine tool, information on a workpiece to be machined in the NC machine tool, and information on a tool to be used in the NC machine tool;
a machining state information estimator configured to arrange, in a virtual space, a virtual workpiece set based on the information on the workpiece stored in the information storage and a virtual tool set based on the information on the tool stored in the information storage in such a manner that the virtual workpiece and the virtual tool have a positional relation identical to a positional relation based on the control information, and then relatively move the arranged virtual workpiece and virtual tool in accordance with the control information stored in the information storage and estimate a machining state that varies with time in virtual machining of the workpiece in accordance with relative movement of the workpiece and tool, wherein the machining state information estimator is configured to estimate, as the machining state information, machining state information including at least one selected from among information on a contact state between each cutting edge of the tool and the workpiece in a direction of contact depth between the tool and the workpiece, information on a contact state between each cutting edge of the tool and the workpiece in a direction of rotation of the tool, information on a cutting resistance applied to each cutting edge of the tool, information on surface roughness of the workpiece, and information on a cutting depth of each cutting edge of the tool in the direction of rotation of the tool; and
an image data generator configured to, based on machining state information along time axis estimated by the machining state information estimator, generate image data for representing amounts of the machining state information along the time axis as an image.

2. The machining state information estimation device of claim 1, wherein the image data generator is configured to generate, as the image data, image data including at least data on a color for representing the machining state.

3. The machining state information estimation device of claim 1, wherein:
the image data generator is configured to generate, as the image data, color image data composed of multiple color elements;
the machining state information estimator is configured to estimate, as the machining state information, machining state information including a number of pieces of information corresponding to a number of said color elements and selected from among information on a contact state between the tool and the workpiece in a direction of contact depth between each cutting edge of the tool and the workpiece, information on a contact state between each cutting edge of the tool and the workpiece in a direction of rotation of the tool, information on a cutting resistance applied to each cutting edge of the tool, information on surface roughness of the workpiece, and information on a cutting depth each cutting edge of the tool in the direction of rotation of the tool; and
the color elements are assigned respectively with one of the pieces of information estimated by the machining state information estimator.

4. The machining state information estimation device of claim 1, wherein the machining state information estimation device includes a display unit configured to, based on the image data generated by the image data generator, display an image corresponding to the image data.

5. A machining state diagnosis apparatus comprising:
the machining state information estimation device of claim 1;
a learning information storage storing relationship information associating estimated machining state information estimated when virtually machining the workpiece using the control information for estimation with actual machining state information obtained when performing actual machining using the control information for estimation, the relationship information being learned empirically; and
a machining state diagnosis unit configured to diagnose whether a machining state in actual machining using predetermined control information is appropriate or not, based on machining state information obtained during the actual machining using the predetermined control information, estimated machining state information estimated based on the predetermined control information by the machining state information estimator of the machining state information estimation device, and the relationship information stored in the learning information storage.

6. The machining state information estimation device of claim 1, wherein the image data generator is configured to generate, as the image data, image data including at least data on a color for representing the machining state.

7. The machining state information estimation device of claim 1, wherein the machining state information estimation device includes a display unit configured to, based on the image data generated by the image data generator, display an image corresponding to the image data.

8. The machining state information estimation device of claim 2, wherein the machining state information estimation device includes a display unit configured to, based on the image data generated by the image data generator, display an image corresponding to the image data.

9. The machining state information estimation device of claim 3, wherein the machining state information estimation device includes a display unit configured to, based on the image data generated by the image data generator, display an image corresponding to the image data.

10. The machining state information estimation device of claim 6, wherein the machining state information estimation device includes a display unit configured to, based on the image data generated by the image data generator, display an image corresponding to the image data.

11. A machining state diagnosis apparatus comprising:
the machining state information estimation device of claim 1;
a learning information storage storing relationship information associating estimated machining state information estimated when virtually machining the workpiece using the control information for estimation with actual machining state information obtained when performing actual machining using the control information for estimation, the relationship information being learned empirically; and
a machining state diagnosis unit configured to diagnose whether a machining state in actual machining using predetermined control information is appropriate or not, based on machining state information obtained during the actual machining using the predetermined control information, estimated machining state information estimated based on the predetermined control information by the machining state information estimator of the machining state information estimation device, and the relationship information stored in the learning information storage.

12. A machining state diagnosis apparatus comprising:
the machining state information estimation device of claim 2;
a learning information storage storing relationship information associating estimated machining state information estimated when virtually machining the workpiece using the control information for estimation with actual machining state information obtained when performing actual machining using the control information for estimation, the relationship information being learned empirically; and
a machining state diagnosis unit configured to diagnose whether a machining state in actual machining using predetermined control information is appropriate or not, based on machining state information obtained during the actual machining using the predetermined control information, estimated machining state information estimated based on the predetermined control information by the machining state information estimator of the machining state information estimation device, and the relationship information stored in the learning information storage.

13. A machining state diagnosis apparatus comprising:
the machining state information estimation device of claim 3;
a learning information storage storing relationship information associating estimated machining state information estimated when virtually machining the workpiece using the control information for estimation with actual machining state information obtained when performing actual machining using the control information for estimation, the relationship information being learned empirically; and
a machining state diagnosis unit configured to diagnose whether a machining state in actual machining using predetermined control information is appropriate or not, based on machining state information obtained during the actual machining using the predetermined control information, estimated machining state information estimated based on the predetermined control information by the machining state information estimator of the machining state information estimation device, and the relationship information stored in the learning information storage.

14. A machining state diagnosis apparatus comprising:
the machining state information estimation device of claim 4;
a learning information storage storing relationship information associating estimated machining state information estimated when virtually machining the workpiece using the control information for estimation with actual machining state information obtained when performing actual machining using the control information for estimation, the relationship information being learned empirically; and
a machining state diagnosis unit configured to diagnose whether a machining state in actual machining using predetermined control information is appropriate or not, based on machining state information obtained during the actual machining using the predetermined control information, estimated machining state information estimated based on the predetermined control information by the machining state information estimator of the machining state information estimation device, and the relationship information stored in the learning information storage.

15. A machining state diagnosis apparatus comprising:
the machining state information estimation device of claim 6;
a learning information storage storing relationship information associating estimated machining state information estimated when virtually machining the workpiece using the control information for estimation with actual machining state information obtained when performing actual machining using the control information for estimation, the relationship information being learned empirically; and
a machining state diagnosis unit configured to diagnose whether a machining state in actual machining using predetermined control information is appropriate or not, based on machining state information obtained during the actual machining using the predetermined control information, estimated machining state information estimated based on the predetermined control information by the machining state information estimator of the machining state information estimation device, and the relationship information stored in the learning information storage.

16. A machining state diagnosis apparatus comprising:
the machining state information estimation device of claim 7;
a learning information storage storing relationship information associating estimated machining state information estimated when virtually machining the workpiece using the control information for estimation with actual machining state information obtained when performing actual machining using the control information for estimation, the relationship information being learned empirically; and
a machining state diagnosis unit configured to diagnose whether a machining state in actual machining using predetermined control information is appropriate or not, based on machining state information obtained during the actual machining using the predetermined control information, estimated machining state information estimated based on the predetermined control information by the machining state information estimator of the machining state information estimation device, and the relationship information stored in the learning information storage.

17. A machining state diagnosis apparatus comprising:
the machining state information estimation device of claim 8;
a learning information storage storing relationship information associating estimated machining state information estimated when virtually machining the workpiece using the control information for estimation with actual machining state information obtained when performing actual machining using the control information for estimation, the relationship information being learned empirically; and
a machining state diagnosis unit configured to diagnose whether a machining state in actual machining using predetermined control information is appropriate or not, based on machining state information obtained during the actual machining using the predetermined control information, estimated machining state information estimated based on the predetermined control information by the machining state information estimator of the machining state information estimation device, and the relationship information stored in the learning information storage.

18. A machining state diagnosis apparatus comprising:
the machining state information estimation device of claim 8;
a learning information storage storing relationship information associating estimated machining state information estimated when virtually machining the workpiece using the control information for estimation with actual machining state information obtained when performing actual machining using the control information for estimation, the relationship information being learned empirically; and
a machining state diagnosis unit configured to diagnose whether a machining state in actual machining using predetermined control information is appropriate or not, based on machining state information obtained during the actual machining using the predetermined control information, estimated machining state information estimated based on the predetermined control information by the machining state information estimator of the machining state information estimation device, and the relationship information stored in the learning information storage.

19. A machining state diagnosis apparatus comprising:
the machining state information estimation device of claim 10;
a learning information storage storing relationship information associating estimated machining state information estimated when virtually machining the workpiece using the control information for estimation with actual machining state information obtained when performing actual machining using the control information for estimation, the relationship information being learned empirically; and
a machining state diagnosis unit configured to diagnose whether a machining state in actual machining using predetermined control information is appropriate or not, based on machining state information obtained during the actual machining using the predetermined control information, estimated machining state information estimated based on the predetermined control information by the machining state information estimator of the machining state information estimation device, and the relationship information stored in the learning information storage.

* * * * *